ated June 14, 1966

3,256,282
4-AMINO-5-HYDROXYPYRIDAZONES-(6)
Franz Reicheneder and Karl Dury, both of Ludwigshafen (Rhine), Germany, assignors to Badische Anilin- & Soda-Fabrik Aktiengesellschaft, Ludwigshafen (Rhine), Germany
No Drawing. Filed Oct. 19, 1964, Ser. No. 404,939
Claims priority, application Germany, Oct. 26, 1963, B 74,025
6 Claims. (Cl. 260—250)

This invention relates to a process for the production of 4-amino-5-hydroxypyridazones-(6) and to the said substances themselves.

It is an object of this invention to provide a process for the production of very valuable novel 4-amino-5-hydroxypyridazones-(6). Another object of the invention is to provide the said novel 4-amino-5-hydroxypyridazones-(6) themselves. These novel pyridazones are valuable initial materials for the production of azo dyes.

In accordance with this invention it has been found that the desired 4-amino-5-hydroxypyridazones-(6) having the formula:

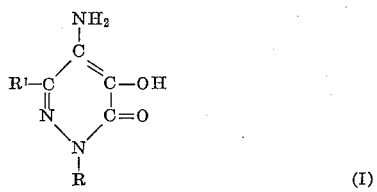

(I)

are obtained by reducing 4-nitro-5-hydroxypyridazones-(6) having the formula:

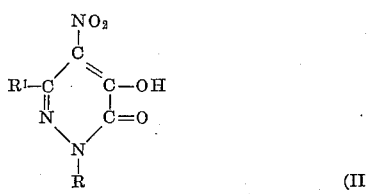

(II)

or alkali metal salts thereof, in the presence of a solvent and, if necessary, acidifying the reaction mixture.

In the formula: R denotes a hydrogen atom, an alkyl group, an alkyl group bearing an alkoxy, carbalkoxy group or a halogen atom as a substituent, a cycloaklyl group, an aralkyl group, an aryl group which may bear an alkoxy group or a halogen atom as a substituent, or an arylsulfonyl group, and $R^1$ denotes a hydrogen atom, an aralkoxy group or an aryl group.

The 4-nitro-5-hydroxypyridazones-(6) and their alkali metal salts used as initial materials have not hitherto been known. They may be obtained for example by reacting 1 mole of a 4,5-dihalopyridazone-(6) having the general formula:

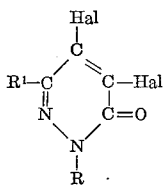

in which R and $R^1$ have the meanings given above and Hal denotes a halogen atom, with advantageously at least 3 moles of a nitrate in the presence of water and in the presence or absence of a solvent and/or suspension agent at temperatures of from about 50° to 180° C. 4,5-dihalopyridazones-(6) are described for example in German patent specification No. 1,086,238.

The preferred initial materials are 4-nitro-5-hydroxypyridazones-(6), or their sodium or potassium salts, in which the radical R in the Formula II denotes a hydrogen atom or an alkyl radical having one to four carbon atoms which may bear as a substituent one carbalkoxy group whose alkoxy group contains one to four carbon atoms. The radical R may also denote a phenyl radical which may bear as a substituent one alkoxy group having one to four carbon atoms or one chlorine or bromine atom, the benzyl radical or the benzenesulfonyl radical. The radical $R^1$ in the preferred initial pyridazones-(6) denotes a hydrogen atom, an aralkoxy radical having seven to nine carbon atoms or the phenyl radical.

4-nitro-5-hydroxypyridazones-(6) or their alkali metal salts may be reduced catalytically to the corresponding 4-amino-5-hydroxypyridazones-(6) with hydrogen in the presence of conventional hydrogenation catalysts, such as metals of group VIII of the Periodic System, for example Raney nickel, platinum or palladium. It is advantageous to carry out the hydrogenation at superatmospheric pressure. Thus for example hydrogen pressures of up to 200 atmospheres may be used. It is preferred to use a pressure of from 0.5 to 50 atmospheres gauge. To increase the rate of reaction, it is advantageous to use elevated temperature, for example 30° to 150° C. Hydrogenation may however also be carried out at lower temperatures, for example at room temperature, such as 10° to 30° C.

Hydrogenation of the 4-nitro-5-hydroxypyridazones-(6) or their alkali metal salts to the corresponding aminopyridazones may also be carried out with reducing agents, such as hydrazine or sodium dithionite.

The process is advantageously carried out in the presence of a solvent, such as alcohol, glacial acetic acid, dioxane, tetrahydrofurane, dimethylformamide or N-methylpyrrolidone or mixtures thereof. The amount of solvent used is not critical. As a rule a 1 to 10% by weight solution of the 4-nitro-5-hydroxypyridazone-(6) to be reduced is used.

The new 4-amino-5-hydroxypyridazones-(6) which can be prepared according to the invention are valuable initial materials for the production of azo dyes capable of being metallized. Thus the new aminopyridazones-(6) may be diazotised with sodium nitrite, the diazonium salt may be coupled for example with β-naphthol and the coupling product may be metallized with a heavy metal salt, for example iron chloride. The metallized azo dyes thus obtained are valuable wool dyes. The aminopyridazones-(6) may furthermore be used as weak organic reducing agents for the development of photographic films.

The invention is further illustrated by the following examples in which parts are by weight.

*Example 1*

1000 parts of the sodium salt of 1-phenyl-4-nitro-5-hydroxypyridazone-(6) is suspended in 4000 parts of water in a stainless steel hydrogenation autoclave and 20 parts of Raney nickel is added. Hydrogenation is carried out at 40° C. under a hydrogen pressure of 40 atmospheres gauge. Six hours later, the reaction mixture is worked up by filtering off the catalyst and acidifying the alkaline reacting solution with dilute hydrochloric acid to a pH value of 3. 650 parts of 1-phenyl-4-amino-5-hydroxypyridazone-(6) is obtained which, after it has been recrystallized from dimethylformamide, melts at 224° to 225° C. The yield is 81.5% of the theory with reference to 1-phenyl - 4 - nitro-5-hydroxypyridazone-(6) used.

Analysis. — $C_{10}H_9O_2N_3$ (203.2). Calculated: C, 59.10%; H, 4.46%; O, 15.75%; N, 20.68%. Found: C, 59.6%; H, 4.3%; O, 15.8%; N, 20.5%.

Example 2

10 parts of 1-phenyl-4-nitro-5-hydroxypyridazone-(6) is dissolved in 150 parts of methanol and hydrogenated in a vibrating autoclave in the presence of 10% of Raney nickel at 80° C. and a hydrogen pressure of 200 atmospheres. Two hours later, the product is worked up by cooling the solution, filtering and substantially distilling off the methanol. 7 parts of 1-phenyl-4-amino-5-hydroxypyridazone-(6) crystallizes out; it is identical with the product in Example 1. The yield is 78.3% of the theory with reference to 1-phenyl-4-nitro-5-hydroxypyridazone-(6) used.

Example 3

100 parts of 1-phenyl-4-nitro-5-hydroxypyridazone-(6) is suspended in 150 parts of tetrahydrofurane and about 25 parts of Raney nickel is added to the suspension. Hydrogenation is then carried out at 40° to 50° C. and at a hydrogen pressure of 100 atmospheres. Two hours later, the mixture is filtered and the tetrahydrofurane solution is concentrated. 30 parts of 1-phenyl-4-amino-5-hydroxypyridazone-(6) crystallizes out. The filter cake, having a gray green colour, consists mainly of the nickel salt of 1-phenyl-4-amino-5-hydroxypyridazone-(6) and concentrated hydrochloric acid is added to it. The solution formed is adjusted to pH=4 by adding sodium acetate. Another 30 parts of 1-phenyl-4-amino-5-hydroxypyridazone-(6) is thus precipitated. The compound is identical with that described in Example 1. The yield in all is 67% of the theory with reference to 1-phenyl-4-nitro-5-hydroxypyridazone-(6).

Example 4

A suspension of 20 parts of 1-methyl-4-nitro-5-hydroxypyridazone-(6) in 100 parts of tetrahydrofurane, and 3 parts of Raney nickel are introduced into a hydrogenation autoclave and hydrogenation is carried out at about 95° C. and 100 atmospheres hydrogen pressure. The whole is filtered and concentrated hydrochloric acid is added to the filter cake. 9 parts of the hydrochloride of 1-methyl-4-amino-5-hydroxypyridazone-(6) crystallizes out. It is recrystallized from methanol. White felted needles are obtained having a melting point of 198° to 200° C.

*Analysis.*—$C_5H_7N_3O_2 \cdot HCl$ (177.5). Calculated: C, 33.8%; H, 4.51%; O, 18.05%; N, 23.65%; Cl, 20.05%. Found: C, 34.8%; H, 4.8%; O, 18.6%; N, 23.7%; Cl, 20.0%.

By dissolving the hydrochloride in twenty times the amount of water at 80° to 90° C., 7 parts of 1-methyl-4-amino-5-hydroxypyridazone-(6) is obtained on cooling; it melts at 234° to 235° C. The yield is 42.5% of the theory with reference to 1-methyl-4-nitro-5-hydroxypyridazone-(6) used.

*Analysis.* — $C_5H_7O_2N_3$ (141.13). Calculated: C, 42.55%; H, 5.0%; O, 22.67%; N, 29.78%. Found: C, 41.4%; H, 5.1%; O, 23.6%; N, 30.0%.

Example 5

20 parts of 4-nitro-5-hydroxypyridazone-(6) is suspended in 100 parts of tetrahydrofurane, 15 parts of Raney nickel is added and hydrogenation is carried out at 100° C. and 100 atmospheres hydrogen pressure. Three hours later, the product is worked up as described in Example 4, and 15 parts of the hydrochloride of 4-amino-5-hydroxypyridazone-(6) is obtained. It is recrystallized from a large amount of water, 11 parts of 4-amino-5-hydroxypyridazone-(6) being obtained in crystalline form. A sample recrystallized from water melts at 290° C.

*Analysis.*—$C_4H_5O_2N_3$ (127.10). Calculated: C, 37.80%; H, 3.97%; O, 25.18%; N, 33.06%. Found: C, 38.1%; H, 4.0%; O, 25.8%; N, 32.4%.

Example 6

30 parts of 1-benzyl-3-benzyloxy-4-nitro-5-hydroxypyridazone-(6) is dissolved in 500 parts of tetrahydrofurane and hydrogenation is carried out in an autoclave with 1.5 parts of palladized charcoal (5%) as catalyst and under a hydrogen pressure of 40 atmospheres gauge at 50° C. The product is filtered and extensively concentrated so that 25 parts of a crystalline residue is obtained which is recrystallized from acetonitrile. 22 parts of 1-benzyl-3-benzyloxy-4-amino-5-hydroxypyridazone-(6) is obtained in the form of white crystals having a melting point of 164° to 165° C.

*Analysis.*—$C_{18}H_{17}O_3N_3$ (323.34). Calculated: C, 66.86%; H, 5.30; O, 14.85%; N, 13.0%. Found: C, 67.2%; H, 5.4%; O, 14.9%; N, 12.9%.

Example 7

40 parts of 1-m-chlorophenyl-4-nitro-5-hydroxypyridazone-(6) is dissolved in 500 parts of tetrahydrofurane. 2 parts of palladized charcoal (5%) is added and hydrogenation is carried out in an autoclave at a hydrogen pressure of 40 atmospheres gauge and 50° C. The product is filtered, the filtrate concentrated to a great extent and the crystalline residue (30 parts) is recrystallized from acetonitrile. 25 parts of 1-m-chlorophenyl-4-amino-5-hydroxypyridazone-(6) is obtained having a melting point of 176° to 177° C.

*Analysis.*—$C_{10}H_8O_2N_3Cl$ (237.5). Calculated: C, 50.0%; H, 3.37%; O, 13.45%; N, 17.65%; Cl, 14.95%. Found: C, 50.8%; H, 3.4%; O, 13.6%; N, 17.9%; Cl, 14.5%.

Example 8

10 parts of 1-methyl-3-phenyl-4-nitro-5-hydroxypyridazone-(6) is dissolved in 300 parts of tetrahydrofurane and hydrogenation is carried out in an autoclave with 0.5 part of palladized charcoal (5%) at 50° C. under a hydrogen pressure of 40 atmosphere gauge. The contents of the autoclave are then filtered and the filtrate extensively concentrated so that 8 parts of a crystalline residue remain. This is recrystallized from dioxane and the mother liquor is worked up. A total of 7.5 parts of 1-methyl-3-phenyl-4-amino-5-hydroxypyridazone-(6) is obtained having a melting point of 228° to 229° C.

*Analysis.*—$C_{11}H_{11}O_2N_3 \cdot H_2O$ (235.24). Calculated: C, 56.16%; H, 5.57%; O, 20.40%; N, 17.86%. Found: C, 55.8%; H, 5.4%; O, 21.0%; N, 17.8%.

A sample which has been dried in vacuo over $P_2O_5$ at 100° C. for twelve hours has the following analysis:

$C_{11}H_{11}O_2N_3$ (217.22). Calculated: C, 60.82%; H, 5.10%; O, 14.73%; N, 19.35%. Found: C, 60.8%; H, 5.4%; O, 15.6%; N, 19.3%.

Example 9

10 parts 1-(p-toluenesulfonyl)-4-nitro-5-hydroxypyridazone-(6) in the form of the potassium salt is dissolved in 100 parts of water, then 0.5 part of palladized animal charcoal (5%) is added and hydrogenation is carried out at 50° C. and a hydrogen pressure of 40 atmospheres gauge. Three hours later, the whole is allowed to cool, the pressure is released, the solution is freed from catalyst by filtration and the filtrate is acidified. 6 parts of a white substance crystallizes out. It is recrystallized once from methanol and once from acetonitrile and pure 1-(p-toluenesulfonyl)-4-amino-5-hydroxypyridazone-(6) having a melting point of 193° to 194° C. is obtained.

*Analysis.*—$C_{11}H_{11}O_4N_3S$ (281). Calculated: C, 46.9%; H, 3.915%; O, 22.75%; N, 14.95%; S, 11.4%. Found: C, 46.5%; H, 3.9%; O, 22.5%; N, 14.9%; S, 11.4%.

Example 10

5 parts of 1-cyclohexyl-4-nitro-5-hydroxypyridazone-(6) is dissolved in 70 parts of alcohol and hydrogenated with 0.2 part of platinum oxide at room temperature and atmospheric pressure. When absorption of hydrogen has ended, the solution is freed from catalyst by filtration and concentrated; 3.5 parts of 1-cyclohexyl - 4-amino-5-hydroxypyridazone-(6) is obtained. After having been recrystallized from acetonitrile, it melts at 188° to 189° C.

Analysis.—$C_{10}H_{15}O_2N_3$ (209.24). Calculated: C, 57.40%; H, 7.23%; O, 15.29%; N, 20.08%. Found: C, 57.2%; H, 7.4%; O, 15.4%; N, 19.7%.

*Example 11*

0.5 part of 1-(p-methoxyphenyl)-4-nitro-5-hydroxypyridazone-(6) is dissolved in 50 parts of alcohol and hydrogenated at room temperature and atmospheric pressure in a vibrating apparatus with a platinum catalyst which has been prepared by shaking 0.1 part of platinum oxide in aqueous suspension in a hydrogen atmosphere. After the absorption of hydrogen has ended, the catalyst is filtered off and the alcohol evaporated on a waterbath. The crystalline residue is recrystallized from acetonitrile. 0.4 part of 1-(p-methoxyphenyl)-4-amino-5-hydroxypyridazone-(6) is obtained in the form of white gray needles having a melting point of 228° to 229° C.

Analysis. — $C_{11}H_{11}O_3N_3$ (233.22). Calculated: C, 56.65%; H, 4.75%; O, 20.58%; N, 18.02%. Found: C, 57.2%; H, 5.0%; O, 19.5%; N, 18.0%.

*Example 12*

0.8 part of N-(α-carbethoxyethyl)-4-nitro-5-hydroxypyridazone-(6) having the formula:

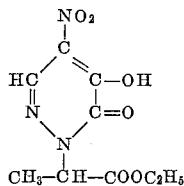

is dissolved in 50 parts of ethanol and hydrogenated with platinum in a vibrating apparatus as described in Example 10. 0.6 part of N-(α-carbethoxyethyl)-4-amino-5-hydroxypyridazone-(6) is obtained as a crude crystalline product which when recrystallized from methanol gives white crystals having a melting point of 129° to 130° C.

Analysis. — $C_9H_{13}O_4N_3$ (227.22). Calculated: C, 47.57%; H, 5.77%; O, 28.17%; N, 18.49%. Found: C, 47.8%; H, 6.0%; O, 29.0%; N, 17.6%.

*Example 13*

10 parts of 1-phenyl-4-nitro-5-hydroxypyridazone-(6) is dissolved in 100 parts of ethanol at boiling temperature. 5 parts of Raney nickel is added and then 20 parts of hydrazine hydrate is added in portions. When the vigorous reaction has subsided, the violet suspension formed is acidified with concentrated hydrochloric acid and cooled. 8 parts of 1-phenyl-4-amino-5-hydroxypyridazone-(6) crystallizes out.

*Example 14*

5 parts of 1-phenyl-4-nitro-5-hydroxypyridazone-(6) is dissolved at room temperature in 100 parts of dilute ammonia and then 15 parts of sodium dithionite is added in portions. The mixture heats up and becomes acid. It is cooled and 4 parts of 1-phenyl-4-amino-5-hydroxypyridazone-(6) crystallizes out.

We claim:
1. A 4-amino-5-hydroxypyridazone-(6) having the formula:

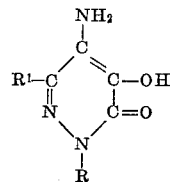

wherein R denotes a member selected from the group consisting of hydrogen, alkyl having 1 to 4 carbon atoms, alkyl bearing as a substituent a carbalkoxy group whose alkoxy group contains 1 to 4 carbon atoms, phenyl, phenyl bearing as a substituent one alkoxy group having 1 to 4 carbon atoms, phenyl bearing one chlorine atom as a substituent, phenyl bearing one bromine atom as a substituent, benzyl and benzenesulfonyl, $R^1$ denotes a member selected from the group consisting of hydrogen, aralkoxy having 7 to 9 carbon atoms, and phenyl.

2. 1-phenyl-4-amino-5-hydroxypyridazone-(6).
3. 1-methyl-4-amino-5-hydroxypyridazone-(6).
4. 1-benzyl-3-benzyloxy-4-amino-5-hydroxypyridazone-(6).
5. 1-(p-toluenesulfonyl)-4-amino-5-hydroxypyridazone-(6).
6. N - (α - carbethoxyethyl)-4-amino-5-hydroxypyridazone-(6).

No references cited.

NICHOLAS S. RIZZO, *Primary Examiner.*

HENRY R. JILES, *Assistant Examiner.*